Patented Mar. 22, 1938

2,111,584

UNITED STATES PATENT OFFICE 2,111,584

PROCESS FOR MAKING FORMALDEHYDE

James F. Eversole, Charleston, W. Va., assignor, by mesne assignments, to Union Carbide and Carbon Corporation, a corporation of New York No Drawing. Application December 22, 1932, Serial No. 648,438

12 Claims. (Cl. 260—138)

The invention is a process for making formaldehyde by catalytically dehydrogenating methanol.

A principal object of my invention is to provide a novel and economically feasible process for making formaldehyde. Another object is to provide a new method of partially dehydrogenating methanol to obtain as the principal products formaldehyde and hydrogen. The invention also includes catalysts useful in my new process.

It is known that formaldehyde can be made from methanol by two procedures. In one instance, the methanol is oxidized to produce formaldehyde and water. This method has been generally adopted and is used commercially. The second method comprises dehydrogenation of the methanol to form formaldehyde and hydrogen, but so far as I am aware, this method has never received more than purely academic attention, and but meager reports on the process are available in the literature.

The dehydrogenation of methanol to form formaldehyde is a partial dehydrogenation of the alcohol, and may be represented by the equation (1) $CH_3OH + (22.17 \text{ cal.}) \xrightarrow{\text{catalyst}} HCHO + H_2$
  Methanol                                      Formaldehyde  Hydrogen (Heat requirements are in kilogram calories). The process to be successful must be operated to cause this reaction (1) to proceed primarily and to avoid subsequent reaction either as (2) $HCHO + (2.38 \text{ cal.}) \rightarrow CO + H_2$
  Formaldehyde                Carbon    Hydrogen
                              monoxide or as (3) $2HCHO \rightarrow CH_3OOCH + (27.8 \text{ cal.})$
  Formaldehyde      Methyl
                    formate In the first secondary reaction, (2), complete decomposition takes place at the expense of the primary product, formaldehyde. In the second reaction, (3), the primary product, formaldehyde, is condensed and rearranged in the Cannizarro reaction to form the ester, methyl formate. Other unfavorable conditions result in the formation of varying amounts of by-products, such as water, methane, ethylene, carbon dioxide, dimethyl ether, methylal and higher condensation products. By means of my process hereinafter described in detail, I am enabled to control the partial dehydrogenation of methanol to produce useful yields of formaldehyde without incurring undue losses of material through secondary reactions.

In general, the process of my invention comprises passing methanol in the vapor phase and in the presence or absence of water vapor over a metal catalyst at a temperature between about 450° and about 750° C. I prefer to operate the process at about atmospheric pressure and to employ a catalyst which has a surface of reduced copper or metallic silver.

The products of the process include unchanged methanol, formaldehyde, water, and, at the lower temperatures within the range indicated, some methyl formate. A fixed gas composed principally of hydrogen with some carbon monoxide and traces of carbon dioxide and methane is also produced. I prefer to pass the vapors over the catalyst in my process with space velocities in excess of about 1000 liters of methanol vapor per liter of catalyst per hour.

The following tabulated data will serve to illustrate my invention:

| Run No. | 1 | 2 | 3 | 4 | 5 |
|---|---|---|---|---|---|
| Pressure, atmospheres | 1 | 1 | 1 | 1 | 1 |
| Temperature—°C | 600 | 750 | 600 | 600 | 700 |
| Space velocity—l./l./hr.* | 1224 | 1051 | 1271 | 1107 | 1489 |
| Methanol fed—grams | 153 | 608.5 | 736.5 | 269.5 | 119 |
| Water fed—grams | 21.5 | 85.5 | 103.5 | 37.9 | 0 |
| Liquid products—grams | 152.8 | 517.1 | 811.8 | 295.0 | 84.3 |
| Contained—grams | | | | | |
| Formaldehyde | 421 | 151.4 | 96.8 | 34.1 | 34.3 |
| Methanol | 83.5 | 271.1 | 611.7 | 223.0 | 44.0 |
| Water | 27.1 | 85.5 | 103.0 | 37.9 | 6.0 |
| Methyl formate | 0.1 | 0.0 | 0.0 | 0.0 | 0.0 |
| Gaseous products—liters | 70.1 | 461.6 | 85.6 | 37.2 | 102.2 |
| Contained—volume % | | | | | |
| $H_2$ | 86.0 | 77.0 | 96.7 | 98.1 | 73.6 |
| CO | 12.9 | 21.6 | 2.0 | 0.5 | 24.8 |
| $CO_2$ | 0.2 | 0.7 | 0.8 | 1.0 | 0.0 |
| $C_2H_4$ | 0.0 | 0.0 | 0.0 | 0.0 | 0.0 |
| $CH_2(OCH_3)_2$ | 0.0 | 0.0 | 0.0 | 0.0 | 0.0 |
| $(CH_3)_2O$ | 0.0 | 0.0 | 0.0 | 0.0 | 0.0 |
| $CH_4$ | 0.9 | 0.7 | 0.5 | 0.4 | 1.5 |
| Production ratio—g./l./hr.** | 510 | 374 | 239 | 201 | 490 |

* Space velocity refers to liters of methanol vapor calculated at standard conditions passing over one liter of catalyst in one hour.
** Production ratio refers to the grams of formaldehyde produced by one liter of catalyst in one hour.

In these operations the catalysts were contained in a silica tube (for which may be substituted a tube of copper or other suitable material) during operation, and the several catalysts employed are identified below:

In preparing the catalyst for Run No. 1, 100 mesh copper gauze was dipped in a silver nitrate solution to obtain a surface plating of silver on the copper, and before use it was reduced in a stream of methanol vapor. The catalyst analyzed 99% Cu and 1% Ag. The catalyst was reactivated when its initial activity had been decreased by continued use by oxidizing the catalyst in a blast of air, followed by reduction.

For Run No. 2, copper wire which had been oxidized and then reduced at 800° C. in a stream of hydrogen was used as the catalyst.

For Run No. 3, copper wire which had been oxidized and then reduced by hydrogen at 720° C. was used as the catalyst.

For Run No. 4, copper wire having a surface of silver was used as the catalyst. An analysis of the catalyst showed it to contain 99.4% Cu and 0.6% Ag. Prior to use it was reduced in a stream of methanol vapor.

For Run No. 5, 100 mesh pure copper gauze was used as the catalyst and was prepared and reduced by heating strongly and quenching in methanol. In this run no water was added to the inlet gases, but the outlet gases were spray quenched in 1 liter of water which quantity was omitted from the tabulated data.

In all of the runs tabulated, the methanol and water (except in Run No. 5) were vaporized together and passed through the tube containing the catalyst. The catalyst tube was heated electrically and was placed in a horizontal position with a free space in the tube ahead of the catalyst to serve as a preheating chamber for the incoming vapors. The issuing products passed successively through a water-cooled condenser, a water spray scrubber for the formaldehyde and a cold-trap, after which the fixed gases were measured and analyzed.

As is evident from the data above, the conditions of operation may vary considerably. Temperatures approaching the upper limit of the preferred range, or, about 750° C., cause appreciable decomposition of formaldehyde with resultant formation of carbon monoxide, hence temperatures above about 750° C. should be avoided. I prefer space velocities greater than about 1000 liters per liter per hour, but the space velocity may vary between about 500 and about 1500 liters per liter per hour. Where water vapor is fed to the process, the ratio of methanol vapor to water vapor may vary from about 3:1 to about 5:1 (by volume), and I prefer to use methanol vapor and water vapor in the ratio of about 4:1.

I claim:—

1. Process for partially dehydrogenating methanol to obtain formaldehyde which comprises passing methanol in the presence of water over a metal catalyst at a temperature between about 450° and about 750° C., and recovering formaldehyde from the effluent vapors, said catalyst having a surface composed of one of the group consisting of reduced copper and silver.

2. Process for partially dehydrogenating methanol to obtain formaldehyde which comprises passing methanol vapor together with water vapor at substantially atmospheric pressure over a metal catalyst at a temperature between about 450° and about 750° C., and recovering formaldehyde from the effluent vapors, said catalyst having a surface composed of one of the group consisting of reduced copper and silver.

3. Process for partially dehydrogenating methanol to obtain formaldehyde which comprises passing methanol vapor at substantially atmospheric pressure and at space velocities of from about 500 to about 1500 liters per liter per hour over a metal catalyst at a temperature between about 450° and about 750° C., and recovering formaldehyde from the effluent vapors, said catalyst having a surface composed of one of the group consisting of reduced copper and silver.

4. Process for partially dehydrogenating methanol to obtain formaldehyde which comprises passing methanol vapor together with water vapor at substantially atmospheric pressure and at space velocities of from about 500 to about 1500 liters per liter per hour over a metal catalyst at a temperature between about 450° and about 750° C., and recovering formaldehyde from the effluent vapors, said catalyst having a surface composed of one of the group consisting of reduced copper and silver.

5. Process for partially dehydrogenating methanol to obtain formaldehyde which comprises passing methanol vapor together with water vapor in the volume ratio of from about 3:1 to about 5:1 at substantially atmospheric pressure and at space velocities of from about 500 to about 1500 liters per liter per hour over a metal catalyst at a temperature between about 450° and about 750° C., and recovering formaldehyde from the effluent vapors, said catalyst having a surface composed of one of the group consisting of reduced copper and silver.

6. Process for partially dehydrogenating methanol to obtain formaldehyde which comprises passing methanol and water vapors in the volume ratio of about 4:1 at substantially atmospheric pressure and at a space velocity of about 1000 liters per liter per hour over a metal catalyst having a surface composed of one of the group consisting of reduced copper and silver at a temperature of about 600° C., and recovering formaldehyde from the effluent vapors.

7. Process for partially dehydrogenating methanol to obtain formaldehyde which comprises passing methanol and water vapors in the volume ratio of about 4:1 at substantially atmospheric pressure and at a space velocity of about 1000 liters per liter per hour over a metal catalyst having a surface composed of reduced copper at a temperature of about 600° C., and recovering formaldehyde from the effluent vapors.

8. Process for partially dehydrogenating methanol to obtain formaldehyde which comprises passing methanol and water vapors in the volume ratio of about 4:1 at substantially atmospheric pressure and at a space velocity of about 1000 liters per liter per hour over a metal catalyst having a surface composed of silver at a temperature of about 600° C., and recovering formaldehyde from the effluent vapors.

9. Process for partially dehydrogenating methanol to obtain formaldehyde which comprises passing methanol vapor at substantially atmospheric pressure and at space velocities of from about 500 to about 1500 liters per liter per hour over a metal catalyst at a temperature between about 450° and about 750° C., and recovering formaldehyde by immediately quenching with water the effluent vapor products, said catalyst having a surface composed of one of the group consisting of reduced copper and metallic silver.

10. Process for partially dehydrogenating methanol to obtain formaldehyde which comprises passing methanol vapor at substantially atmospheric pressure and at a space velocity of about 1500 liters per liter per hour over a metal catalyst at a temperature of about 700° C., and recovering formaldehyde by immediately quenching with water the effluent vapor products, said catalyst having a surface composed of reduced copper.

11. In a process for making formaldehyde by the dehydrogenation of methanol at temperatures of 450° to 750° C., the use of copper oxide reduced at a temperature above 700° C. as a catalyst.

12. In a process for making formaldehyde by the dehydrogenation of methanol at temperatures of 450° to 750° C., the use of metallic copper having a surface plating of silver as a catalyst.

JAMES F. EVERSOLE.